Patented Feb. 22, 1938

2,109,357

UNITED STATES PATENT OFFICE 2,109,357

LUBRICATING OIL

Bert H. Lincoln, Ponca City, and Alfred Henriksen, deceased, late of Ponca City, Okla., by Ellen M. Henriksen, administratrix, Ponca City, Okla., assignors, by mesne assignments, to The Lubri-Zol Development Corporation, Cleveland, Ohio, a corporation of Delaware No Drawing. Application January 22, 1934, Serial No. 707,782

7 Claims. (Cl. 87—9)

This invention relates to lubricating oils, and more particularly to improved methods for the production of high quality lubricating oils and such products as new compositions of matter.

This application is a continuation-in-part of a co-pending application Serial No. 616,741, filed June 11, 1932, and is specific to the use of naturally occurring esters.

It is well known that mineral lubricating oils are deficient in oiliness characteristics, which is the most important character of the lubricant when used under conditions of boundary lubrication where the viscosity of the lubricant plays little or no part in lubrication. Boundary lubrication conditions are obtained when engines are operating at heavy loads, low speed, or if for any reason the supply of lubricant is cut off or not sufficient. The last condition may exist when for mechanical reasons the lubricant pump is not functioning properly, or when the lubricant's feed line is clogged with foreign matter. There is also the condition of insufficient lubrication arising at the time the motor is being started under cold weather conditions. Considerable wear occurs from the time the rubbing surfaces start moving and before the cold highly viscous lubricating oil reaches the surfaces to be lubricated.

One object of the invention is to provide a lubricant of high oiliness character, low coefficient of friction, and one which will act as a safety factor in lubrication when abnormal conditions exist for one reason or another, making efficient viscous lubrication impossible. Another object of the invention is to provide a lubricant which will maintain a very low coefficient of friction and high film strength when diluted with light hydrocarbons such as are obtained in an automobile crank case by incomplete combustion of the fuel.

A further object of the invention is to provide a lubricant having penetrative lubricity characteristics.

Still another object of the invention is to reduce the cold test of lubricants which have relatively high cold test and at the same time obtain the previously mentioned advantageous characteristics.

It has been demonstrated a number of times that hydrocarbon lubricants of the very best quality are not constant in coefficient of friction and are also deficient in load carrying, as well as oiliness characteristics.

The methods which now have been discovered and the lubricant prepared thereby for accomplishing the above object consist broadly of adding halogenated naturally occurring esters or waxes to mineral oil hydrocarbon lubricants. It has been found that practically all of the naturally occurring high molecular weight waxes contribute much more constant coefficient of friction to the lubricant when added after chlorination and that the load carrying capacity of the lubricant after the addition of the halogenated wax-ester is greatly improved. Also it has been found that the addition of some of the halogenated naturally occurring esters reduce the cold test of the lubricants substantially.

In practicing the invention only small quantities of the various halogenated naturally carrying waxes are added to hydrocarbon lubricants. The halogenated wax-ester is well blended with the lubricant and the mixture is ready for use. To prove the efficiency and value of the invention, the coefficient of friction of the original hydrocarbon lubricant was determined by testing it on the Herschel friction testing machine, which was developed by Dr. W. H. Herschel of the United States Bureau of Standards, and is well known to the art. The coefficient of friction of the mixture of hydrocarbon oil and halogenated natural occurring wax-ester is then determined by the same machine. To determine the load carrying characteristics of the product of the invention, the Timken testing machine was used which has been developed and described by the Timken Roller Bearing Company. By determining the load carrying capacity of the original hydrocarbon lubricant on the Timken machine and then determining the load carrying capacity of another sample of the same lubricant to which has been added a small percentage of the halogenated naturally occurring wax-esters, the improvement in load carrying capacity can be determined. To determine the reduction in cold test of the lubricant upon the addition of the halogenated naturally occurring ester, the customary A. S. T. M. test is used.

The following examples of the invention are given not as limitations to the invention, but to more clearly demonstrate the invention:

Example No. 1

Naturally occurring carnauba wax was chlorinated until it contained approximately 30% of chlorine by weight; this chlorinated carnauba wax was added to a 22-degree (Fahrenheit) cold test lubricant, which showed on Timken test seizure and break-down of the oil film at a load of 7000 pounds per square inch. Upon addition of 1% of the previously described chlorinated carnauba wax, the cold test of the blend was minus 5° F. and the Timken film strength of the blended lubricant was 22,500 pounds per square inch. It is seen by this example that the addition of 1% of chlorinated carnauba wax more than trebled the film strength and reduced the cold test from 22° F. to minus 5° F. The other halogens, such as fluorine, iodine, and bromine, might have been used, but due to the higher cost, chlorine was used. It is well known that commercial carnauba wax contains a large percentage of myricyl cerotate and it is the halogenation of the myricyl cerotate and the other compounds existing in the natural occurring esters which give this improvement.

*Example No. 2*

A commercial sample of spermaceti was chlorinated until it contains 12% of chlorine by weight. Upon addition of 1% of this chlorinated spermaceti to the previously described mineral lubricant, the Timken film strength was found to be 10,500 pounds, or a vast improvement over the original load carrying capacity of 7000 pounds. Spermaceti contains cetyl palimatate as a naturally occurring ester and the halogenation of the commercial spermaceti gives the desirable results. The spermaceti after halogenation did not lower the cold test of the original hydrocarbon lubricant in the same degree as the halogenated carnauba wax. The Herschel coefficient of friction of the mineral oil blended with the halogenated spermaceti was improved.

*Example No. 3*

A commercial sample of beeswax was separated by one of the well-known means and the myricyl palimatate resulting from such separation was halogenated and added to the previously described hydrocarbon lubricant. The myricyl palimatate was halogenated until it contained approximately 30% of chlorine and 1% of this chlorinated product was added to the mineral oil. Upon testing this blend the Timken film strength was found to be 22,500 pounds, as compared to 7000 pounds for the original hydrocarbon lubricant. The cold test lowering was not as great with the myricyl palimatate as it was with the carnauba wax. The coefficient of friction of the mineral oil blended with the chlorinated myricyl palimatate was improved.

*Example No. 4*

A commercial sample of candelilla wax was chlorinated until it contained 25% of chlorine by weight and the chlorinated candelilla wax added to the previously described mineral hydrocarbon lubricant and the Timken film strength tested and found to be 22,500 pounds. Thus it is seen that the chlorinated candelilla wax increases the film strength of a mineral hydrocarbon lubricant from 7000 pounds to 22,500 pounds. The coefficient of friction as determined by the Herschel testing machine on the original hydrocarbon lubricant and on another sample of the hydrocarbon lubricant blended with chlorinated candelilla wax, indicated that the blended material was much better in coefficient of friction characteristics.

A large number of other examples of the use of halogenated naturally occurring esters or waxes might be given, but it would only unduly lengthen the specification. It is contemplated to cover within the scope of this invention the following types of naturally occurring waxes:

(1) Liquid waxes, such as spermoil, bottlenose oil and the like.

(2) Solid waxes, both of vegetable and animal derivation. Under the vegetable classification would be mentioned carnauba wax, candelilla wax, Raphia wax, cottonseed wax, gondang wax, palm wax, and the like. Under the animal classification would come beeswax, spermaceti, Rump gland wax and the like.

In addition to the solid and liquid waxes, there is another classification of wax which covers various kinds and is usually captioned "miscellaneous waxes". Under this class may be mentioned Japan wax, myrtle wax, and the like.

It is to be understood that the term "naturally occurring esters" or waxes, as used in the claims and in this specification is intended to cover all naturally occurring ester-like waxes but excludes glycerides. The commercially available products are satisfactory, and since the usual impurities present in the average grade of commerical products do not affect the efficiency of the invention, the cost and time required in removing the impurities is not justified.

It has been found that the original hydrocarbon lubricants to which the halogenated naturally occurring waxes or esters are to be added, may be of any classification and any degree of viscosity, including hydrogenated lubricating oils and those obtained generally on the market. The halogen may be added to the natural occurring ester or wax in any manner, the only requirement being that the halogen is introduced into the molecules. The degree of halogenation may vary over wide limits, depending upon the nature of the natural occurring wax or ester being halogenated and the subsequent contemplated use. It is possible that as low as 5% halogen in the original wax, or slightly less, would be satisfactory in some cases and in others a halogen content of as much as 50% or more by weight would be required. The halogen may be introduced into either the alcohol radical of the natural occurring wax or into the acid radical, or into both. No doubt some of the impurities contained in the naturally occurring wax or ester are halogenated and may contribute to the efficiency of this invention. It is not intended to cover within the scope of this invention, any method of halogenation, as all of the methods that have been tried have proved satisfactory. The halogens, that is, chlorine, bromine, iodine and fluorine are included within the scope of the invention.

In the examples given 1% of halogenated wax was used, however, when using poorer quality original hydrocarbon lubricants, larger quantities of halogenated naturally occurring waxes are required to obtain the desired results. In one determination which was made, it was found that .5% of halogenated carnauba wax which contained 30% of chlorine, when added to an original hydrocarbon lubricant with a Timken film strength of 7000 pounds, increased the film strength of the mineral hydrocarbon lubricant to 19,000 pounds. It is of course understood that quantities smaller than .5% might be added to obtain the desired results. Quantities as low as .1% or as high as 5% or more may be used within the scope of our invention. With any given hydrocarbon lubricant one skilled in the art of preparing lubricants can easily determine the percentage of halogenated naturally occurring wax or ester required to give the smooth operation, low co-efficient of friction and high film strength. The percentage to be added for lowering the cold test can be determined by one skilled in the art. In most cases the quantity which will be required to accomplish the desired results will be between .1% and 2%.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is therefore to be understood that the invention is not to be limited to the specific details shown and described.

Having thus described the invention, what is claimed is:

1. A lubricating oil comprising in combination a hydrocarbon oil and a small amount of a halogenated, natural occurring ester, having wax-like characteristics.

2. A lubricating oil comprising in combination a hydrocarbon oil and a small amount of a chlorinated naturally occurring ester, having wax-like characteristics selected from the following group: spermoil, bottlenose oil, carnauba wax, candelilla wax, Raphia wax, cottonseed wax, gondang wax, palm wax, beeswax, spermaceti, Rump gland wax, Japan wax, myrtle wax.

3. A lubricating oil comprising in combination a hydrocarbon oil and a small quantity of chlorinated carnauba wax.

4. A lubricating oil comprising in combination a hydrocarbon oil and from 0.10% to about 5%, based on the amount of such oil, of a halogenated naturally occurring ester having wax-like characteristics.

5. A lubricating oil comprising in combination a hydrocarbon oil and a small amount of a halogenated naturally occurring ester having wax-like characteristics, which halogenated ester contains from about 5% to about 50% halogen.

6. A lubricating oil comprising in combination a hydrocarbon oil and from 0.10% to about 5%, based on the amount of such oil, of a chlorinated naturally occurring ester having wax-like characteristics, which chlorinated ester contains from about 5% to about 50% chlorine.

7. A lubricating oil comprising in combination a hydrocarbon oil and a small amount of a halogenated naturally occurring wax containing a relatively large percentage of esters.

BERT H. LINCOLN.
ELLEN M. HENRIKSEN,
*Administratrix of the Estate of Alfred Henriksen, Deceased.*